(No Model.)

P. R. STEVENS.
FELLY PLATE.

No. 565,809. Patented Aug. 11, 1896.

Witnesses
John H. Holt.
John C. Wilson.

Inventor
Paul R. Stevens,
by Whitman & Wilkinson
Attorneys

UNITED STATES PATENT OFFICE.

PAUL R. STEVENS, OF PORTLAND, MAINE.

FELLY-PLATE.

SPECIFICATION forming part of Letters Patent No. 565,809, dated August 11, 1896.

Application filed November 4, 1895. Serial No. 567,899. (No model.)

*To all whom it may concern:*

Be it known that I, PAUL R. STEVENS, a citizen of the United States, residing at Portland, in the county of Cumberland and State of Maine, have invented certain new and useful Improvements in Felly-Plates; and I do hereby declare the following to be a full, clear, and exact description of the invention, such as will enable others skilled in the art to which it appertains to make and use the same.

My invention relates to improvements in felly-plates for wheels, and has for its object to provide a stronger means for supporting the joint between the different members of the felly of the wheel.

It is well known that with the most common form of joint, when the wheel is run regularly or to any great extent over rough stony roads, the ends of the fellies at the joint will sag inward, causing a "flat" wheel.

The principal object of my invention is to provide a means for overcoming or remedying this tendency of the joint to sag inward and to preserve the contour of the rim of the wheel.

Reference is had to the accompanying drawings, wherein the same parts are indicated by the same letters throughout both views.

Figure 1:
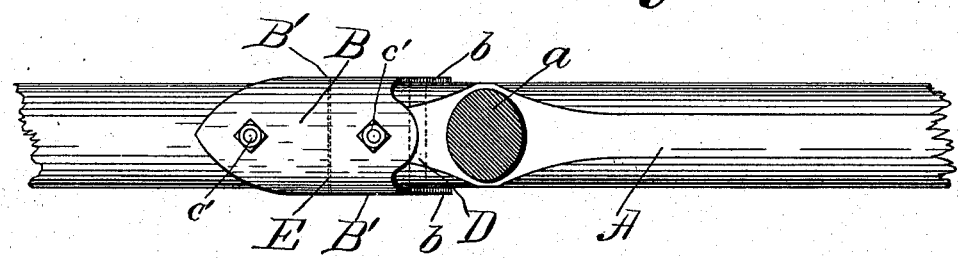
Figure 2:
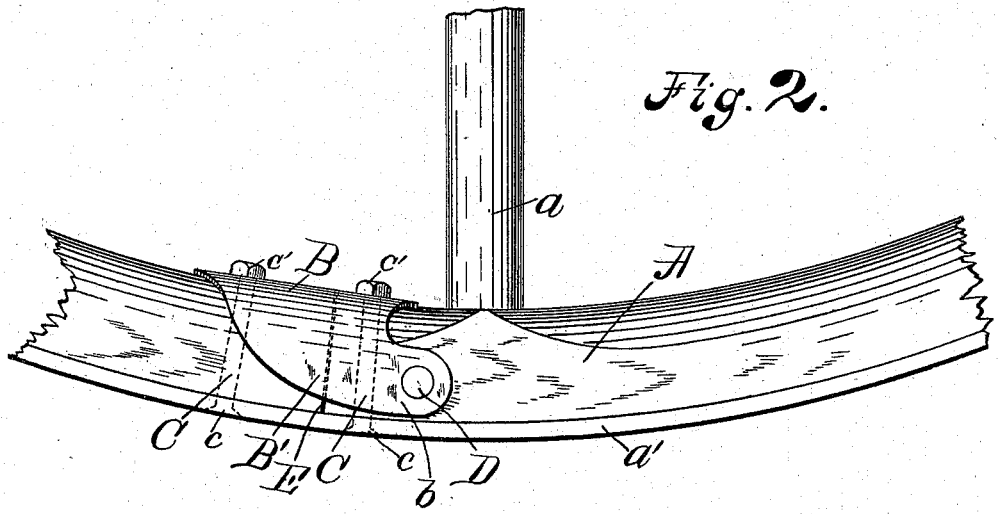

Figure 1 represents a plan of a portion of the rim of a wheel provided with my improved felly-plate, and Fig. 2 represents a side elevation of the same.

A represents a portion of the rim of an ordinary carriage, buggy, or wagon wheel, which rim is composed of two or more members which are joined together end to end.

$a$ represents one of the spokes, and $a'$ the tire.

E represents the junction of the two members of the rim, and B represents the felly-plate as applied to the joint. This joint is made to occur at a point on the rim much nearer to one of the spokes than to the other, instead of being midway between two spokes, as is commonly the practice. In this way a long end is left on one of the members of the rim, and a very short end is left on the opposite end of the adjacent member. The object of so forming the joint is in order to take advantage of the short end of the felly, which is supported by the spoke against radial strains thereon and to make this short end assist in supporting the adjacent long end on the opposite member.

The metal plate B has downwardly-extending sides B', which curve around to one side and terminate in a pair of lugs or ears $b$, which lugs or ears extend outward almost, if not quite, as far as the outer edge of the rim on either side thereof, and are perforated to receive a rivet D, which passes through said lugs or ears on the plate and through the short end of the felly, near the spokes, as shown.

Two bolts C, provided with countersunk heads $c$, pass through the tire and through the felly and the curved plate B, one bolt passing through each of the adjoining ends of the two members, and are secured by nuts $c'$. The purposes of this peculiar form of plate are to have the said plate pivoted by means of the pair of curved lugs or ears $b$ to the sides of the felly near the spoke-socket without interfering in any way with the spoke-tenon, and also to let the rivet D, by means of which the plate is pivoted, serve to prevent the splitting of the felly at this point, which might otherwise occur. The plate B is thus permanently attached to the short end of the felly, and may be turned inward upon this pivot when in cutting the tire it is desired to saw a short piece off of the felly in order to "dish" the wheel. In doing this the long end of the felly can readily be sprung out sufficiently, after the plate has been turned inward, to prevent the saw-teeth striking the plate should the said plate not swing far enough out of the way.

When the portion of the rim of the wheel immediately outside of the long end of the felly strikes a loose or projecting stone or other obstacle, the strain of such a shock, which will tend to push said long end inward and would in time cause a flat wheel, will be taken up by the plate B pulling upon the rivet D, the strain coming on said rivet in the direction of an arc approximately concentric with the circumference of the rim, and it will therefore be seen that the long end of the felly at the joint cannot sag inward to any appreciable degree. The length of the lugs or ears $b$ may be increased, if desired, as the longer these lugs are made the greater will be the leverage acting upon the long end of the felly to support the same.

The short end of the felly at the joint will be supported mainly by the spoke $a$, and also to some extent by the plate B.

The rivet D will prevent the splitting of the felly at the spoke-tenon, the downwardly-projecting sides B' of the plate will prevent the splitting of the ends of the two members of the felly, and the bolt which passes vertically through the short end of the felly will prevent the splitting of the said short end when the strain comes on the rivet D.

Having thus described my invention, what I claim, and desire to secure by Letters Patent of the United States, is—

1. The combination, with a wheel having tire, felly and spokes of the ordinary construction, the joint between the different members of the felly occurring much nearer to one spoke than to the adjacent spoke, thus leaving a long and a short end of the felly opposite each other at the joint; of a curved metal plate having a pair of curved lugs extending outward toward the periphery of the felly and longitudinally thereof, and pivoted upon said short end near the spoke-socket, and fitting over both of said ends of the felly; and bolts passing radially through said tire and through both of said ends of the felly, and said plate, substantially as described.

2. The combination, with a wheel having tire, felly and spokes of the ordinary construction, the joint between the different members of the felly occurring much nearer to one spoke than to the adjacent spoke, thus leaving a long end and a short end of the felly opposite each other at the joint; of the metal plate B having downwardly-extending sides B' terminating in the perforated lugs $b$; a rivet passing through said perforated lugs and through the short end of the felly near the spoke-socket on said end, said plate B being adapted to swing inward upon said rivet as a pivot when desired: and a bolt passing radially through each of said ends of the felly and through the tire and plate B, and binding the parts together, substantially as described.

3. An improved felly-plate B having sides B' terminating in a pair of perforated lugs $b$, the said lugs being adapted to be pivotally attached to the felly and allow of the swinging inward of said plate, and the said plate B having a plurality of holes through its middle portion for the passage of tire-bolts, substantially as described.

In testimony whereof I affix my signature in presence of two witnesses.

PAUL R. STEVENS.

Witnesses:
SAMUEL A. STEVENS,
ARTHUR W. BELL.